United States Patent
Palmer et al.

(10) Patent No.: US 10,431,965 B2
(45) Date of Patent: Oct. 1, 2019

(54) HYDRAULIC CABLE PULLER

(71) Applicant: Winch, LLC, Monroe, NC (US)

(72) Inventors: Claude Anthony Palmer, Monroe, NC (US); Steven McClain Rogers, Indian Trail, NC (US); Michael Ray Richardson, Monroe, NC (US)

(73) Assignee: WINCH, LLC, Monroe, NC (US)

( * ) Notice: Subject to any disclaimer, the term of this patent is extended or adjusted under 35 U.S.C. 154(b) by 0 days.

(21) Appl. No.: 16/251,193

(22) Filed: Jan. 18, 2019

(65) Prior Publication Data

US 2019/0245331 A1    Aug. 8, 2019

Related U.S. Application Data

(63) Continuation-in-part of application No. 15/890,628, filed on Feb. 7, 2018, now abandoned.

(51) Int. Cl.
*H02G 1/08* (2006.01)

(52) U.S. Cl.
CPC .................. *H02G 1/081* (2013.01)

(58) Field of Classification Search
CPC ........... E02F 3/963; H02G 1/08; H02G 1/081; H02G 1/083; H02G 1/085
USPC .... 354/134.5, 323, 134.3 R; 405/183.5, 184; 242/403, 390.7

See application file for complete search history.

(56) References Cited

U.S. PATENT DOCUMENTS

| | | | |
|---|---|---|---|
| 3,788,605 A | 1/1974 | Johnson | |
| 5,152,506 A | 10/1992 | Pickrell | |
| 5,913,639 A | 6/1999 | Ellis | |
| 6,152,425 A | 11/2000 | Boyer | |
| 6,830,235 B2 | 12/2004 | Stafford | |
| 10,008,838 B1 | 6/2018 | Rhodes et al. | |
| 2009/0056079 A1 | 3/2009 | Hamrick | |

*Primary Examiner* — Sunil Singh
(74) *Attorney, Agent, or Firm* — Shumaker, Loop & Kendrick, LLP

(57) ABSTRACT

A hydraulic cable puller that includes a hub having an axially-extending annular winding spindle for receiving a plurality of wraps of a rope adapted to connect to a downstream end of a cable to be pulled and to exert a pulling force on the cable. A hydraulic motor is mounted on the hub for rotating the hub and includes an inlet port and outlet port for being attached to inlet and outlet hydraulic supply conduits of a vehicle. A mounting bracket is adapted to mount the hub and the hydraulic motor onto an end of a boom arm of the vehicle.

16 Claims, 9 Drawing Sheets

HYDRAULIC CABLE PULLER

CROSS REFERENCE TO RELATED PATENT APPLICATIONS

This application, as a Continuation in Part, claims the benefit of and priority to U.S. patent application Ser. No. 15/890,628, filed Feb. 7, 2018, herein expressly incorporated by reference in its entirety.

TECHNICAL FIELD AND BACKGROUND OF THE INVENTION

This invention relates to a hydraulic cable puller adapted for pulling long lengths of cable, for example, electrical power, communication or fiber optic cable, through long lengths of underground conduit. Prior art cable pullers generally use pneumatic systems that are limited in the length of cable that can be successfully pulled through underground conduit. Techniques vary depending on the length of the conduit through which the cable must be pulled, and can include using vacuum to pull a "mouse" attached to a lightweight cord through the conduit to which is then attached a heavier rope which is pulled through the conduit, and finally to which the cable is attached for being pulled through the conduit. In other applications, fish tapes can be used as an initial pass through the conduit. Lubricants, such as gels or viscous coatings, are sometimes used to ease the passage of the cable through the conduit.

Known methods of pulling cable, especially long lengths of heavy cable, are expensive and inefficient. Typical pneumatic systems do not have sufficient power to pull cable through long lengths of conduit, leading to snags, broken cable or blockages. Most construction crews use excavators on sites where cables must be pulled, for example, along highways or in subdivisions. There exists a need for a compact, efficient, effective and inexpensive way to pull long lengths of heavy cable through underground conduit. The invention described in this application allows an on-site excavator to be quickly converted to a hydraulic cable puller, eliminating the need for a cumbersome and expensive wire pulling trailer.

SUMMARY OF THE INVENTION

It is therefore an object of the present invention to provide a cable puller that utilizes hydraulic power to operate a cable-puller.

It is another object of the present invention to provide a hydraulic cable puller for attachment for a hydraulic power supply that is adapted to pull cable through a conduit.

It is another object of the present invention to provide a hydraulic cable puller for attachment to a hydraulic power supply of a mobile construction vehicle.

It is another object of the present invention to provide a hydraulic cable puller for attachment to a boom arm of a tracked mobile construction vehicle.

These and other objects and advantages of the invention are achieved by providing a hydraulic cable puller including a hub having an axially-extending annular winding spindle for receiving a plurality of wraps of a rope adapted to connect to a downstream end of a cable to be pulled and to exert a pulling force on the cable. A hydraulic motor is mounted within a housing on the hub for rotating the hub and including an inlet port and outlet port for being attached to inlet and outlet hydraulic supply conduits of a vehicle. A mounting bracket is adapted to mount the hub and the hydraulic motor onto a sidewall of a bucket attached to an end of a boom arm of the vehicle. The hub and hydraulic motor extend laterally outward from and within a plane of the sidewall exterior to the bucket.

In accordance with a further embodiment, the annular winding spindle of the hub is positioned between first and second flanges.

In accordance with a further embodiment, the annular winding spindle of the hub includes a surface texture adapted to provide enhanced frictional resistance to slippage as the hub pulls the rope to which the cable is attached.

In accordance with a further embodiment, the mounting bracket includes a plate connected to an exterior sidewall of the bucket, a housing containing the motor connected to and extending laterally outward from the plate within the plane of the bucket sidewall, and the hub connected to an end of the housing opposite to the plate.

In accordance with a further embodiment, the plate has a hooked portion for hanging over an edge of the bucket sidewall and partially extending along an interior surface of the bucket sidewall.

In accordance with a further embodiment, the plate is secured to the bucket sidewall with at least one bolt that passes through a hole in the bucket sidewall.

In accordance with a further embodiment, the plate is secured to the bucket with at least one clamping knob having a threaded stem.

In accordance with a further embodiment, a hydraulic cable puller is provided including a hub having an axially-extending annular winding spindle for receiving a plurality of wraps of a rope adapted to connect to a downstream end of a cable to be pulled and to exert a pulling force on the cable. A hydraulic motor is mounted within a housing on the hub for rotating the hub and including an inlet port and outlet port for being attached to inlet and outlet hydraulic supply conduits of a vehicle. A mounting bracket is adapted to mount the hub and the hydraulic motor onto an exterior sidewall of a bucket attached to an end of a boom arm of the vehicle. The hub and hydraulic motor extend laterally outward from the exterior sidewall of the bucket within the plane of the bucket sidewall.

In accordance with a further embodiment, a hydraulic cable puller is provided including a hub having an axially-extending annular winding spindle for receiving a plurality of wraps of a rope adapted to connect to a downstream end of a cable to be pulled and to exert a pulling force on the cable. A hydraulic motor is mounted within a housing on the hub for rotating the hub and including an inlet port and outlet port for being attached to inlet and outlet hydraulic supply conduits of a vehicle. A mounting bracket includes a plate adapted to be connected to an exterior sidewall of a bucket attached to an end of a boom arm of the vehicle, a housing containing the motor connected to and extending laterally outward from the plate within the plane of the bucket sidewall. The hub is connected to an end of the housing opposite to the plate and extending laterally outward from the housing in a laterally outward direction from the plane of the bucket sidewall.

In accordance with a further embodiment, a hydraulic cable puller is provided that includes a hub having an axially-extending annular winding spindle for receiving a plurality of wraps of a rope adapted to connect to a downstream end of a cable to be pulled and to exert a pulling force on the cable. A hydraulic motor is mounted on the hub for rotating the hub and includes an inlet port and outlet port for being attached to inlet and outlet hydraulic supply conduits of a vehicle. A mounting bracket is adapted to mount the hub and the hydraulic motor onto an end of a boom arm of the vehicle.

In accordance with a further embodiment, the hub and the hydraulic motor are mounted on the boom arm in a lateral plane offset from and exterior to a lateral plane of the boom arm.

In accordance with a further embodiment, the hub and the hydraulic motor are mounted on the boom arm in a void between laterally offset first and second side walls of the mounting bracket and in a lateral plane in alignment with a lateral plane of the boom arm.

In accordance with a further embodiment, the annular winding spindle of the hub is positioned between first and second flanges.

In accordance with a further embodiment, the annular winding spindle of the hub includes a surface texture adapted to provide enhanced frictional resistance to slippage as the hub pulls the rope to which the cable is attached.

In accordance with a further embodiment, a hydraulic cable puller is provided, and includes a hub having an axially-extending annular winding spindle provided with a friction-enhancing surface texture and positioned between first and second flanges for receiving a plurality of wraps of a rope adapted to connect to a downstream end of a cable to be pulled and to exert a pulling force on the cable. A hydraulic motor is mounted on the hub for rotating the hub and includes an inlet port and outlet port for being attached to inlet and outlet hydraulic supply conduits of a hydraulically-powered mobile construction vehicle. A mounting bracket is adapted to mount the hub and the hydraulic motor onto an end of a boom arm of a hydraulically-powered mobile construction vehicle.

In accordance with a further embodiment, a mobile cable pulling apparatus is provided and includes a vehicle, including a swing frame, and canopy mounted for rotation on a base frame. An engine and hydraulic power circuit is carried by the base frame and first and second laterally spaced-apart endless tracks are connected by a drive train to the engine for moving and steering the vehicle. A boom is attached to the swing frame and a boom arm is attached to the boom for articulating movement relative to the boom. The hydraulic power circuit is adapted to supply hydraulic power to the boom and boom arm. A hydraulic cable puller is provided and includes a hub having an axially-extending annular winding spindle for receiving a plurality of wraps of a rope adapted to connect to a downstream end of a cable to be pulled and to exert a pulling force on the cable. A hydraulic motor is mounted on the hub for rotating the hub and including an inlet port and outlet port for being attached to inlet and outlet hydraulic supply conduits of the hydraulic circuit of the vehicle. A mounting bracket is adapted to mount the hub and the hydraulic motor onto an end of the boom arm of the vehicle.

BRIEF DESCRIPTION OF THE DRAWING FIGURES

The present invention is best understood when the following detailed description of the invention is read with reference to the accompanying drawings, in which.

DETAILED DESCRIPTION OF THE PREFERRED EMBODIMENT

Figure 1:
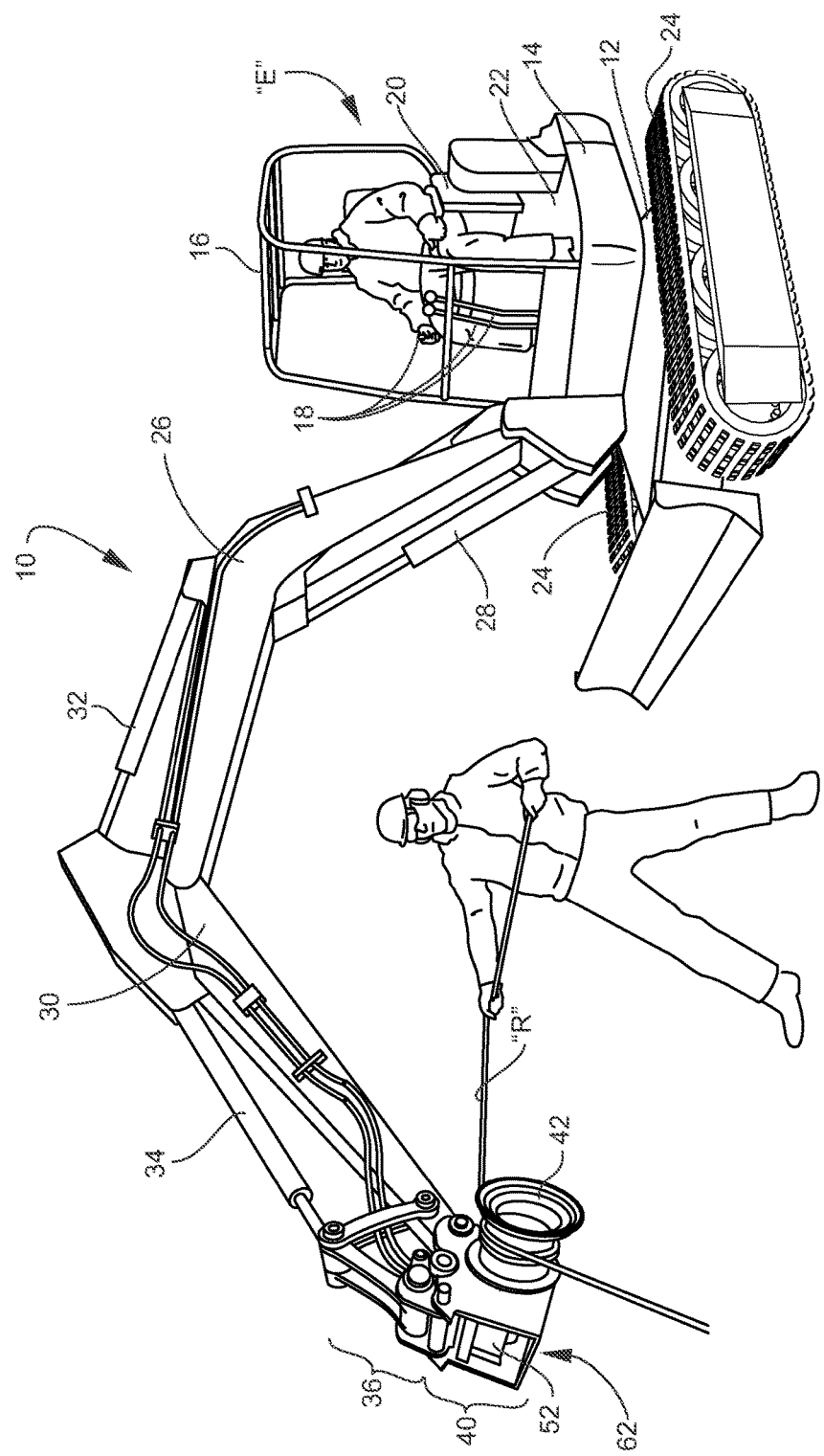
FIG. 1 is a perspective view of an excavator with a hydraulic cable puller positioned on the end of the boom arm and the hydraulic system of the excavator.

Referring now to the drawings, a mobile cable-pulling apparatus 10 is shown in FIG. 1, and uses a tracked excavator "E" to provide mobility at the cable-pulling site and a platform for providing hydraulic power to pull cable. The mobile cable-pulling apparatus 10 includes a base frame 12 on which is mounted a swing frame 14. A canopy 16 encloses operator controls 18 and seat 20. The swing frame 14 also mounts the excavator engine, hydraulic pump and hydraulic circuit components collectively referred to at 22 to the rear of the canopy 16. The swing frame 14 is mounted for rotation on the base frame 12. The base frame 12 mounts a pair of laterally-positioned endless tracks 24 powered by the engine to both provide forward and rearward movement and steering.

A boom 26 is mounted on the swing frame 14 and is moved fore and aft relative to the canopy 16 by a boom cylinder 28. A boom arm 30 is pivotally mounted on the outer end of the boom 26 and is moved relative to the boom 26 by an arm cylinder 32 mounted on a top surface of the boom 26. A bucket cylinder 34 extends along the boom arm 30 and connects to a bucket link assembly 36 to which is typically mounted a bucket (not shown).

Figure 2:
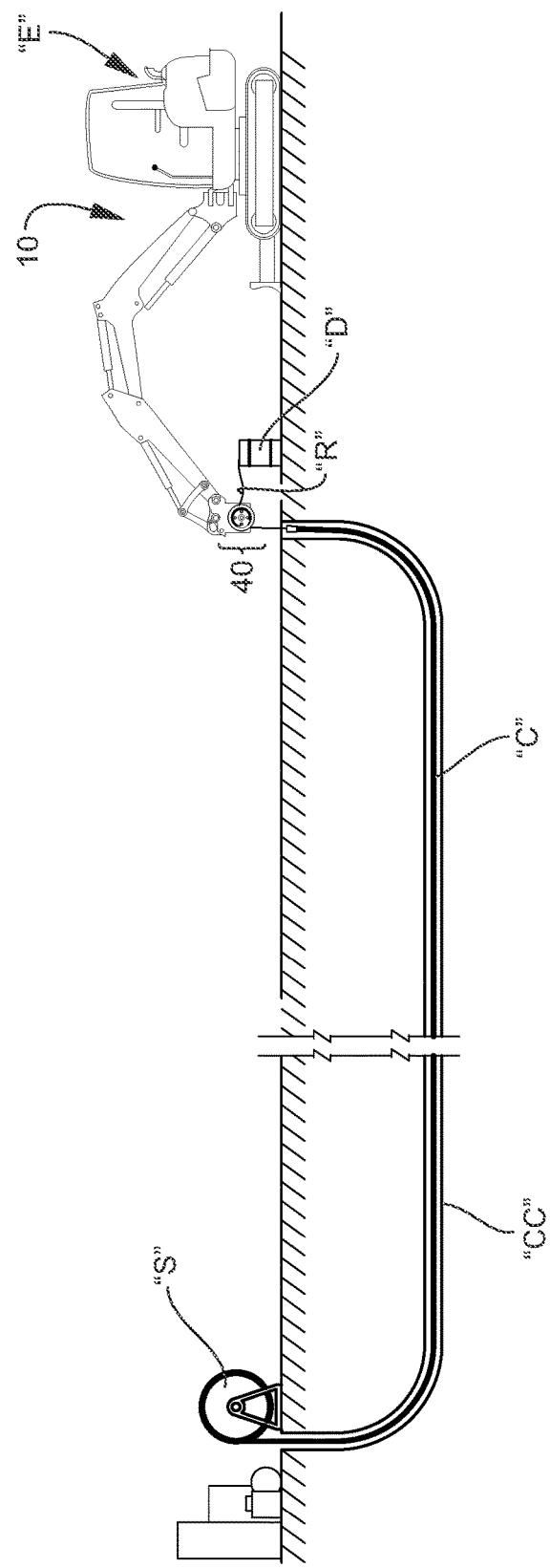
FIG. 2 is a side elevation perspective view showing the cable puller pulling a cable through an underground conduit.

A hydraulic cable puller 40 is mounted to the end of the boom arm 30 and utilizes the engine and hydraulic circuit 22 to pull cable through conduit. As shown in FIG. 2, a rope "R" to which a cable "C" is attached is pulled off of a cable supply reel "S" and through a cable conduit "CC". The rope "R" is deposited into a drum "D" as it comes off of the cable puller 40. The cable "C" may be any electrical power, communication, fiber optic cable or other cable. The invention has particular application in environments where heavy cable must be pulled through long conduits where pneumatic systems are not sufficiently robust to pull a long length of cable through the conduit. In addition, the use of the excavator "E" as both the hydraulic power source and as a means of moving the cable puller 40 to the exact location provides a distinct advantage over trailer-mounted or other platforms which may be large and not efficiently movable as needed. Moreover, because an excavator is often required on site in any event the same excavator "E" can be used to pull the cable "C" by changing the bucket for the cable puller 40.

Figure 3:
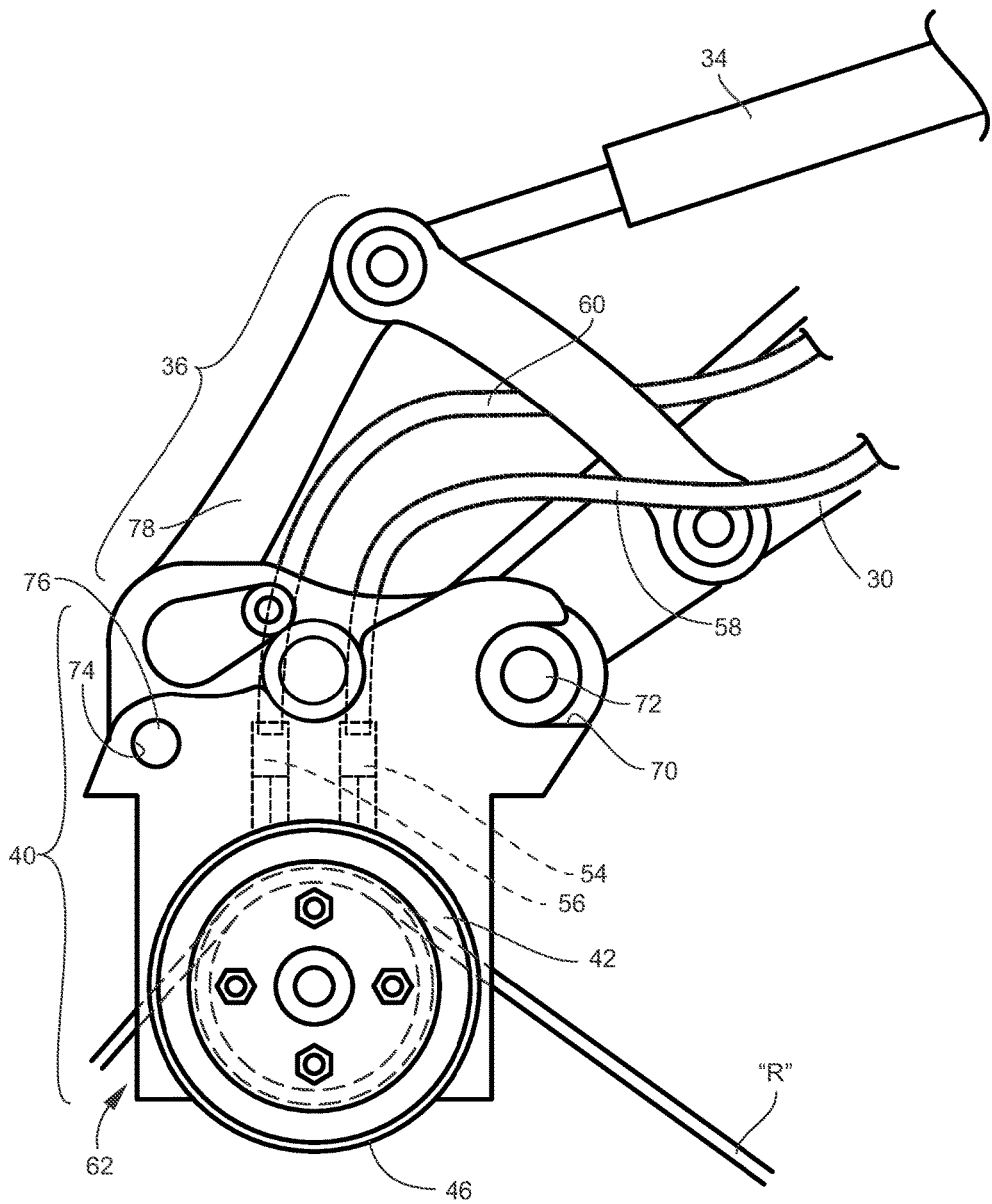
FIG. 3 is a partial side elevation of the cable puller on the end of the boom arm of the excavator.
Figure 4:
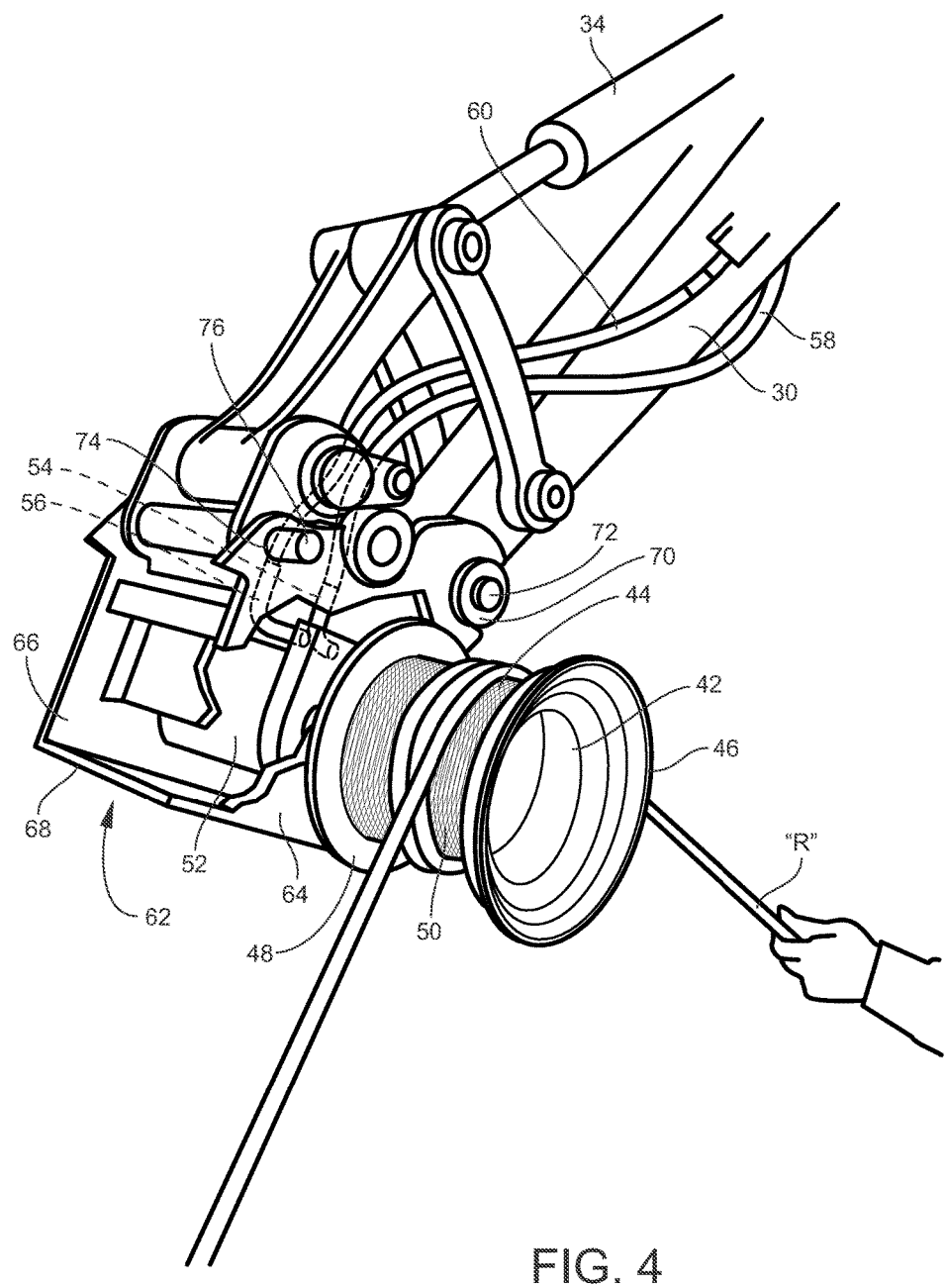
FIG. 4 is a partial perspective view of the cable puller on the end of the boom arm of the excavator.

Referring to FIGS. 3 and 4, the cable puller 40 includes a hub 42 having an axially-extending annular winding spindle 44 for receiving a plurality of wraps of the rope "R" that connects to a downstream end of the cable "C". See FIG. 2. As shown in FIG. 4, flanges 46 and 48 project radially outwardly from the annular winding spindle 44 and prevent the rope "R" from slipping off of the annular winding spindle 44. The annular winding spindle 44 preferably has a surface texture, for example, knurling 50, to provide enhanced frictional resistance to slippage as the hub 42 pulls the rope "R" to which the cable "C" is attached.

A hydraulic motor 52 is mounted on the hub 42 for rotating the hub 42 and includes an inlet port 54 and outlet port 56 for being attached to the hydraulic supply conduits 58 and 60 of the hydraulic circuit 22 of the excavator "E". A mounting bracket 62 mounts the hub 42 and the hydraulic motor 52 onto the boom arm 30. The mounting bracket 62 includes side walls 64, 66 and a bottom wall 68. The top of the bracket 62 includes an open bushing 70 that receives a bucket pin 72 mounted on the boom arm 30. The top of the bracket 62 also includes a bore 74 that receives a bucket pin 76 carried on the end of a bucket link 78 which is operated by the bucket cylinder 34.

Figure 5:
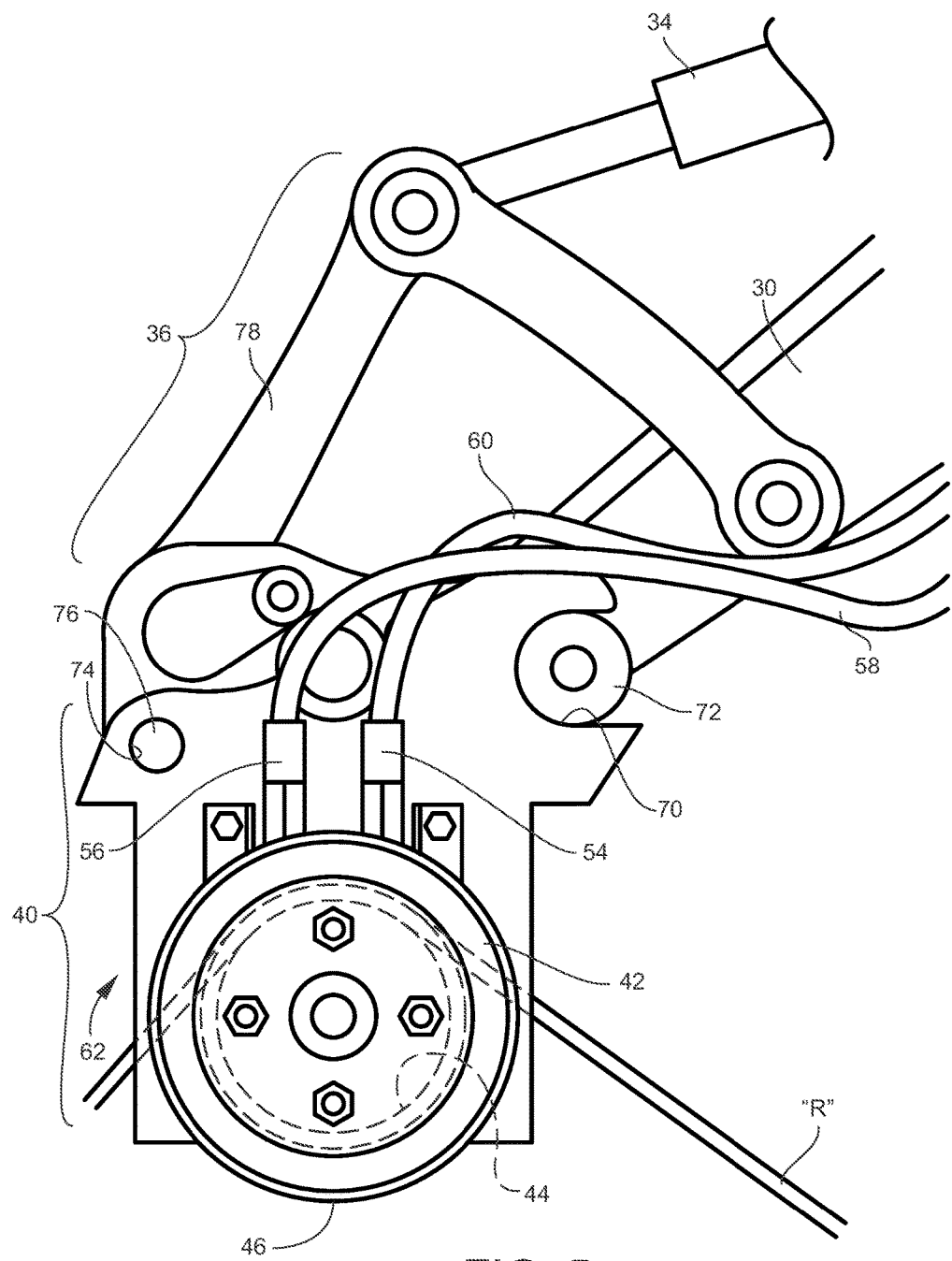
FIG. 5 is a partial perspective view of the cable puller on the end of the boom arm of the excavator according to an alternative embodiment.

While the above description shows the hydraulic motor 52 positioned in alignment with a lateral plane of the boom arm 30 and within the mounting bracket 62, in another embodiment shown in FIG. 5, the hydraulic motor 52 is positioned exterior to the mounting bracket 62 and laterally offset from the boom arm 30. The inlet port 54 and outlet port 56 of the hydraulic motor 52 are attached the hydraulic supply conduits 58 and 60 exterior to the bracket 62.

The swing frame 14, boom 26 and boom arm 30 can therefore be used to precisely position the hub 42 in the correct location to pull the rope "R" out of the cable conduit "CC" with the least strain on both the rope "R" and cable "C".

In accordance with one preferred embodiment of the invention, a Kubota KX040 tail swing excavator is used as the excavator "E". The hydraulic circuit 22 of this excavator has an operating pressure of 2,500 psi (172 Bar). The winding spindle 44 has a diameter of 5 in. (12.7 cm) and generates a winding torque of 4,139 lbsf.in (467 Nm). In a typical application, an adequately lubricated 1 in. (2.5 cm) diameter electrical cable "C" having a weight per foot of 1.5 lbs. (0.7 kg) can be pulled through a 2 in. (5 cm) diameter cable conduit "CC" having a length of 945 feet (288 m) in 21 minutes using a 0.5 in. (1.25 cm) diameter rope "R".

Figure 9:
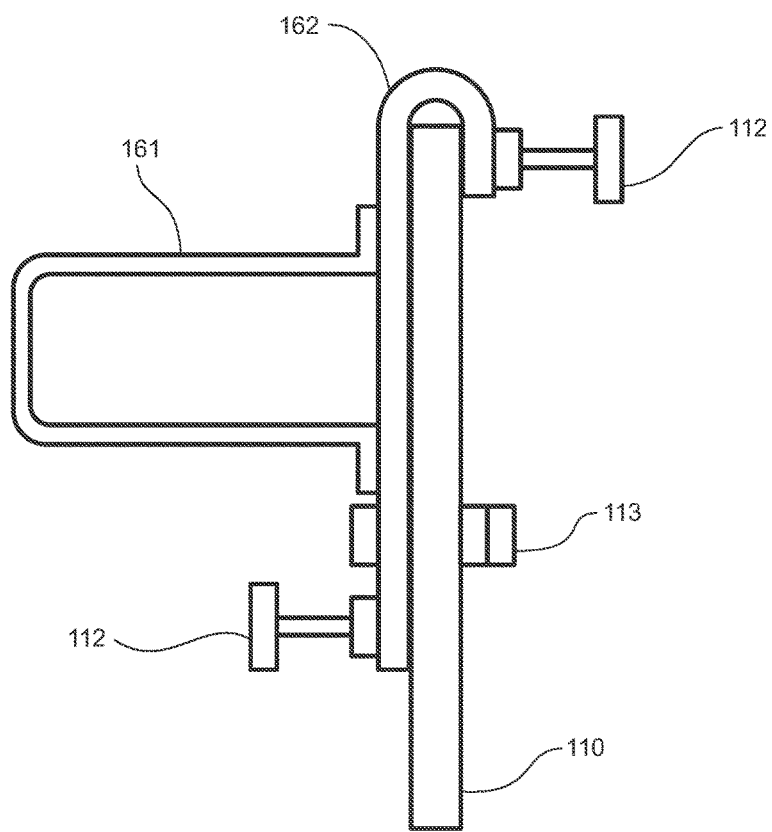
FIG. 9 is a partial side elevation of the alternative embodiment shown in FIG. 6.

Referring now to FIGS. 6-9, an alternative embodiment of a cable puller 101 is shown. A boom 126 is mounted on a swing frame 114 of the excavator "E" and is moved fore and aft relative to a canopy 116 by a boom cylinder 128. A boom arm 130 is pivotally mounted on an outer end of the boom 126 and is moved relative to the boom 126 by an arm cylinder 132 mounted on a top surface of the boom 126. A bucket cylinder 134 extends along the boom arm 130 and connects to a bucket link assembly 136 to which is mounted a bucket 110. A mounting bracket 162 is attached to an outside sidewall surface of the bucket 110. The mounting bracket 162 is secured into place by four clamping knobs having threaded stems 112, two on an outside surface of the mounting bracket 162 and two on an inside surface of the bucket 110 sidewall. Additionally a bolt 113 passes through a hole on the sidewall of the bucket 110 to further secure the mounting plate 162 to the bucket 110. As shown in FIG. 9, the mounting bracket 162 has a top portion that curves over the bucket 110 sidewall. Two clamping knobs 112 are used to secure the mounting bracket 162 from inside of the bucket 110 and two clamping knobs 112 are used to secure the mounting bracket 162 on the outside of the bucket 110.

Figure 6:
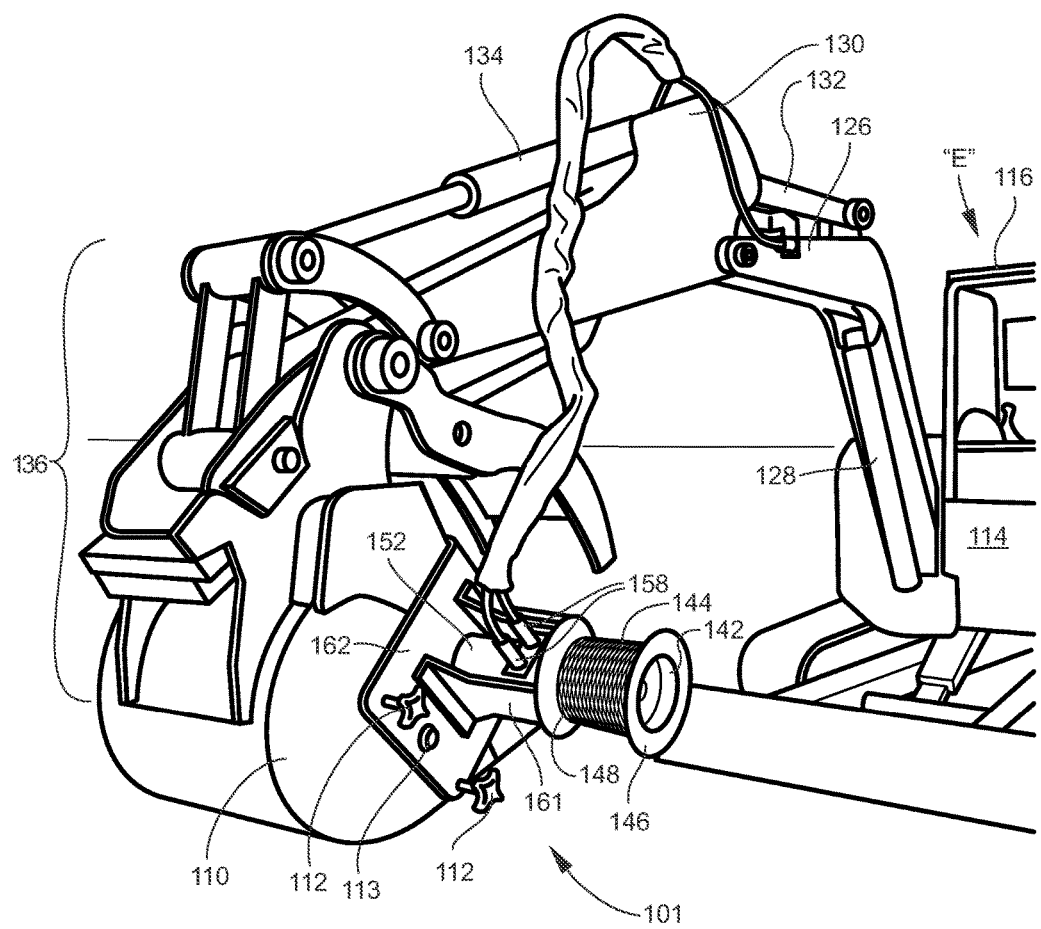
FIG. 6 is a perspective view of an excavator with an alternative embodiment of a hydraulic cable puller.
Figure 7:
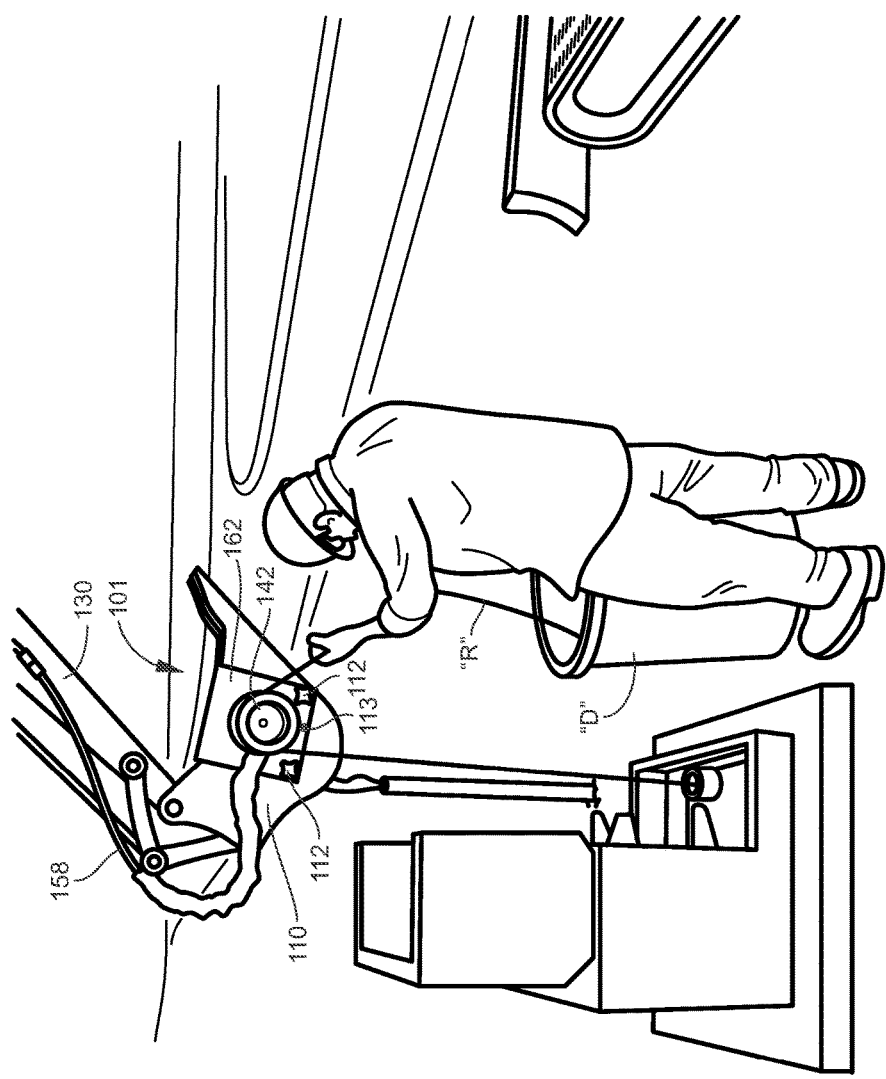
FIG. 7 is an environmental perspective view of the alternative embodiment shown in FIG. 6.
Figure 8:
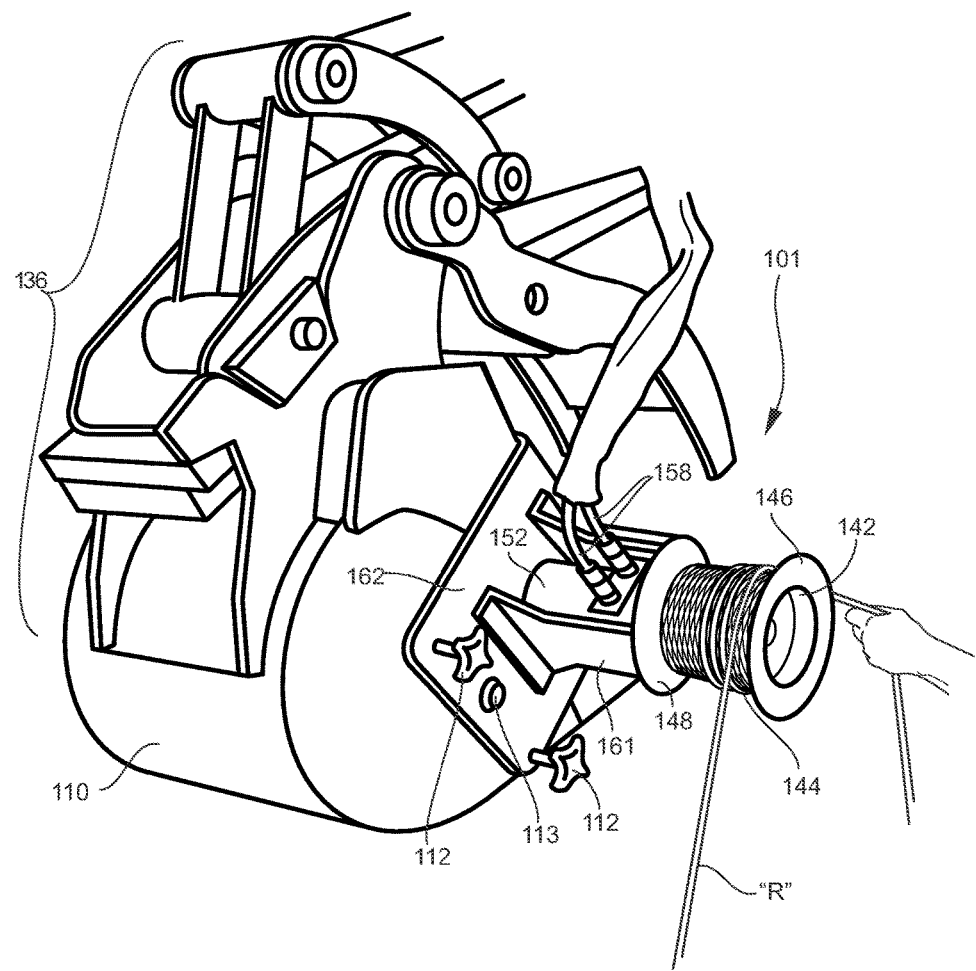
FIG. 8 is a perspective view of the alternative embodiment shown in FIG. 6.

A motor housing 161 is attached to the mounting bracket 162 and extends away from the mounting bracket 162 to form a chamber with at least two sidewalls to house a hydraulic motor 152. Hydraulic supply conduits 158 from the excavator "E" are connected to the motor 152. A hub 142 extends outwardly from an end of the motor housing 161 opposite to the mounting bracket 162. The hub 142 has an axially-extending annular winding spindle 144 for receiving a plurality of wraps of the rope "R" that connects to a downstream end of the cable "C". See FIG. 7. As shown in FIG. 6, flanges 146 and 148 project radially outwardly from the annular winding spindle 144 and prevent the rope "R" from slipping off of the annular winding spindle 144. The annular winding spindle 144 preferably has a surface texture to provide enhanced frictional resistance to slippage as the hub 142 pulls the rope "R" to which the cable "C" is attached. The motor 152 and the hub 142 both extend laterally outward within the plane of the bucket 110 sidewall. In many circumstances, the bucket 110 will still be available for its intended purpose while the cable puller 101 is installed.

A hydraulic cable puller and mobile cable pulling apparatus according to the invention have been described with reference to specific embodiments and examples. Various details of the invention may be changed without departing from the scope of the invention. Furthermore, the foregoing description of the preferred embodiments of the invention and best mode for practicing the invention are provided for the purpose of illustration only and not for the purpose of limitation, the invention being defined by the claims.

We claim:

1. A hydraulic cable puller mounted on a boom arm of an excavator, comprising:
    (a) a hub having an axially-extending annular winding spindle for receiving a plurality of wraps of a rope adapted to connect to a downstream end of a cable to be pulled and to exert a pulling force on the cable;
    (b) a hydraulic motor mounted within a housing on the hub for rotating the hub and including an inlet port and outlet port for being attached to inlet and outlet hydraulic supply conduits of the excavator;
    (c) a mounting bracket adapted to mount the hub and the hydraulic motor onto a sidewall of a bucket attached to an end of the boom arm of the excavator;
    (d) the hub and hydraulic motor extend laterally outward from and within a plane of the sidewall exterior to the bucket; and
    (e) whereby an axis of rotation of the hub perpendicular to the sidewall of the bucket is maintained during movement of the bucket on the boom arm of the excavator.

2. A hydraulic cable puller according to claim 1, wherein the annular winding spindle of the hub is positioned between first and second flanges.

3. A hydraulic cable puller according to claim 1, wherein the annular winding spindle of the hub includes a surface texture adapted to provide enhanced frictional resistance to slippage as the hub pulls the rope to which the cable is attached.

4. A hydraulic cable puller according to claim 1, wherein the mounting bracket is a plate connected to an exterior of the sidewall of the bucket, wherein the housing containing the motor is connected to and extending laterally outward from the plate within the plane of the bucket sidewall and the hub is connected to an end of the housing opposite to the plate.

5. A hydraulic cable puller according to claim 4, wherein the plate has a hooked portion for hanging over an edge of the bucket sidewall and partially extending along an interior surface of the bucket sidewall.

6. A hydraulic cable puller according to claim 4, wherein the plate is secured to the bucket sidewall with at least one bolt attached to the plate and passes through a hole in the bucket sidewall for positioning the plate on the bucket.

7. A hydraulic cable puller according to claim 4, wherein the plate is secured to the bucket with at least one clamping knob having a threaded stem.

8. A hydraulic cable puller mounted on a boom arm of an excavator, comprising:
- (a) a hub having an axially-extending annular winding spindle for receiving a plurality of wraps of a rope adapted to connect to a downstream end of a cable to be pulled and to exert a pulling force on the cable;
- (b) a hydraulic motor mounted within a housing on the hub for rotating the hub and including an inlet port and outlet port for being attached to inlet and outlet hydraulic supply conduits of the excavator;
- (c) a mounting bracket adapted to mount the hub and the hydraulic motor onto an exterior sidewall of a bucket attached to an end of the boom arm of the excavator, the mounting bracket having an upper hooked portion adapted to extend over an edge of the bucket sidewall and partially extend along an interior surface of the bucket sidewall to position and support the mounting bracket in a fixed location relative to the bucket;
- (d) the hub and hydraulic motor adapted to extend laterally outward from the exterior sidewall of the bucket within the plane of the bucket sidewall; and
- (e) whereby an axis of rotation of the hub perpendicular to the sidewall of the bucket is maintained during movement of the bucket on the boom arm of the excavator.

9. A hydraulic cable puller according to claim 8, wherein the annular winding spindle of the hub is positioned between first and second flanges.

10. A hydraulic cable puller according to claim 8, wherein the annular winding spindle of the hub includes a surface texture adapted to provide enhanced frictional resistance to slippage as the hub pulls the rope to which the cable is attached.

11. A hydraulic cable puller according to claim 8, wherein the mounting bracket is secured to the bucket sidewall with at least one bolt attached to the mounting bracket and passes through a hole in the bucket sidewall for positioning the mounting bracket on the bucket.

12. A hydraulic cable puller according to claim 8, wherein the mounting bracket is secured to the bucket with at least one clamping knob having a threaded stem.

13. A hydraulic cable puller mounted on a boom arm of an excavator, comprising:
- (a) a hub having an axially-extending annular winding spindle for receiving a plurality of wraps of a rope adapted to connect to a downstream end of a cable to be pulled and to exert a pulling force on the cable;
- (b) a hydraulic motor mounted within a housing on the hub for rotating the hub and including an inlet port and outlet port for being attached to inlet and outlet hydraulic supply conduits of the excavator;
- (c) a mounting bracket adapted to mount the hub and the hydraulic motor onto an exterior sidewall of a bucket attached to an end of the boom arm of the excavator where the mounting bracket has a hooked portion adapted to extend over an edge of the bucket sidewall and partially extend along an interior surface of the bucket sidewall to support the mounting bracket at a fixed location relative to the position of the bucket;
- (d) the hub connected to an end of the housing opposite to the mounting bracket and extending laterally outward from the housing in a laterally outward direction from the plane of the bucket sidewal;
- (e) whereby an axis of rotation of the hub perpendicular to the sidewall of the bucket is maintained during movement of the bucket on the boom arm of the excavator; and
- (f) a plurality of clamping knobs having threaded stems adapted to extend through the mounting bracket and cooperate with the sidewall of the bucket further securing the mounting bracket to the sidewall of the bucket.

14. A hydraulic cable puller according to claim 13, further comprising a bolt extending through the mounting bracket and the sidewall of the bucket and cooperating with a nut on an inside of the sidewall of the bucket for further securing the mounting bracket to the sidewall of the bucket.

15. A hydraulic cable puller according to claim 13, wherein at least one of the plurality of clamping knobs is positioned on an outside of the sidewall of the bucket.

16. A hydraulic cable puller according to claim 13, wherein at least one of the plurality of clamping knobs is positioned on an inside of the sidewall of the bucket.

\* \* \* \* \*